United States Patent
Chhabra et al.

(10) Patent No.: US 10,503,448 B1
(45) Date of Patent: Dec. 10, 2019

(54) PRINTER SOFTWARE DISTRIBUTION SYSTEM

(71) Applicant: KYOCERA DOCUMENT SOLUTIONS INC., Osaka (JP)

(72) Inventors: Ankur Chhabra, Pleasanton, CA (US); Oleksandr Osadchyy, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/177,370

(22) Filed: Oct. 31, 2018

(51) Int. Cl.
  *G06F 3/12* (2006.01)
  *G06F 8/61* (2018.01)
  *G06F 16/951* (2019.01)

(52) U.S. Cl.
  CPC ............ *G06F 3/123* (2013.01); *G06F 3/1203* (2013.01); *G06F 3/1232* (2013.01); *G06F 3/1288* (2013.01); *G06F 8/63* (2013.01); *G06F 16/951* (2019.01)

(58) Field of Classification Search
  CPC ...... G06F 3/123; G06F 3/1203; G06F 3/1232; G06F 3/1288; G06F 16/951; G06F 8/63; H04N 1/32502; H04N 1/00204; H04N 1/00973; H04N 1/00344
  USPC ................................. 358/1.1–1.18, 474, 402
  See application file for complete search history.

(56) References Cited

U.S. PATENT DOCUMENTS

| | | | |
|---|---|---|---|
| 6,003,065 A * | 12/1999 | Yan | G06F 9/50 709/200 |
| 6,973,647 B2 | 12/2005 | Crudele et al. | |
| 2008/0246986 A1 * | 10/2008 | Scrafford | H04L 41/12 358/1.15 |
| 2015/0317108 A1 * | 11/2015 | Hadano | G06F 3/1203 358/1.15 |
| 2018/0198947 A1 * | 7/2018 | Nuggehalli | H04N 1/32502 |
| 2018/0285165 A1 * | 10/2018 | Helsley | G06F 9/5077 |
| 2018/0373505 A1 * | 12/2018 | Engquist | G06F 8/40 |

* cited by examiner

*Primary Examiner* — Gabriel I Garcia
(74) *Attorney, Agent, or Firm* — McDonnell Boehnen Hulbert & Berghoff LLP (57) ABSTRACT

The present disclosure relates to a method of arranging a cluster of printers that are able to run a customized container image based on the requirements of the applications in the container and the characteristics of the printers in the network. The method includes receiving a container image of software configured to be executed on printers. The method also includes determining and receiving a response to a query for printer characteristics using the server. Additionally, the method includes determining image-eligible micro-services that are configured to execute on a set of selected image-eligible printers selected based on a comparison of the response information with the container-eligible characteristics. Moreover, the method includes determining that the container image is configured to execute image-eligible micro-services. The method further includes, sending the container image to the image-eligible printers and executing the printer management application on the image-eligible printers.

20 Claims, 6 Drawing Sheets

Display 410

Printer Device List

| Status | Model Name | Host Name | DM | Color | Staple | Scan | Duplex Printing | Firmware | USB |
|---|---|---|---|---|---|---|---|---|---|
| Ready | ECOSYS zzz | NM101101 | Comp | Yes | No | No | No | V1.2 | No |
| Ready | ECOSYS xxx | NM301201 | Incomp | No | No | No | No | V1.3 | No |
| Off line | TASKalfa qqq | NM302207 | Comp | No | No | No | No | V1.0 | No |
| Ready | FS-xxxMP zzz | NM104202 | Comp | No | No | No | No | V1.2 | No |
| Ready | FS-xxxMP xxx | NM204002 | Incomp | No | No | No | No | V1.3 | No |
| Off line | EP-xxxMP yyy | NM603002 | Comp | No | No | No | No | V1.0 | No |
| Ready | FS-xxxMP zzz | NM702207 | Comp | Yes | Yes | Yes | Yes | V1.3 | Yes |
| Off line | TASKalfa zzz | NM804202 | Incomp | No | No | No | No | V1.4 | No |
| Ready | FS-yyyMP xxx | NM114002 | Comp | No | No | No | No | V1.7 | No |
| Ready | ECOSYS qqq | NM673202 | Comp | Yes | No | No | Yes | V1.2 | Yes |
| Ready | ECOSYS bbb | NM663202 | Comp | Yes | Yes | Yes | Yes | V1.1 | Yes |
| Ready | ECOSYS qqq | NM673202 | Comp | Yes | No | No | Yes | V1.1 | Yes |

DM Service: Remote Maintenance Container
Fleet Services Container
Security Services Container
Color Services Container
Packaging Services Container Selection 440
Pull Down 430

Download to All 422

Query Network 420

Download to Selected 424

☐ Enable Auto Run 460

Selection 450
Selection 452
Selection 454

PRINTER SOFTWARE DISTRIBUTION SYSTEM

BACKGROUND

Printers have increased in number and geographic footprint throughout the world and have become increasingly connected to networks. These networks can include a print server connected to many print devices. Typically, when one or more documents and/or other print data are scheduled to be printed, the print data is either directly sent to one printer, or sent to the print server.

Some or all of the printers can have different features, functions, and capabilities. For example, some printers print in color, while others do not. As another example, some printers are equipped with duplexing hardware that allows printing on both sides of a sheet of paper, while other printers can only print on one side of a sheet of paper. Some printers are equipped with scanning units and can act as multi-functional peripheral devices. And some printers have a hard disk, a touch screen, and at least one Universal Serial Bus (USB) host port to enables these printers to run workflows and applications similar to other computing devices, such as laptops, tablets, and desktops.

SUMMARY

The specification and drawings disclose embodiments that relate to distributed printing methods using container technology. Container technology is a new technology that allows users to download a container, which is includes software for performing one or more tasks, perhaps as part of a container image, where the container image can include run time components and one or more executable containers. The container runs on the device's operating system kernel without the need of creating virtual machines or installing an additional operating system. Container technology also allows for the formation of a cluster of devices, each of which can execute their own container. A container can have multiple micro-services (specific applications) that can run in numerous copies. Executing micro-services on a cluster of devices enables scaling up of the micro-services by increasing the number of containers to provide frequently used services and/or expensive services provided by the micro-services.

In one aspect, a method is provided. A method to create a cluster of printers that are able to run the container image based on the requirements of the applications in the container image and the characteristics of the printers in the network. The method includes receiving, at a server, a container image of software configured to be executed on one or more printers, where the software comprises one or more micro-services that make up a printer management application, and where the container image is associated with one or more container-eligible characteristics associated with executing the software. The method also includes determining a query for printer characteristics using the server, the printer characteristics comprising one or more characteristics related to printer functionality and one or more characteristics related to printer hardware and/or software configuration. Furthermore, the method includes receiving, at the server, one or more responses to the query, the one or more responses comprising response information about the printer characteristics. Moreover, the method includes determining, at the server, one or more image-eligible micro-services that are configured to execute on a set of image-eligible printers selected based on a comparison of the response information with the container-eligible characteristics. Additionally, the method includes determining, at the server, that the container image is configured to execute one or more image-eligible micro-services based on the one or more image-eligible micro-services. The method also includes sending, from the server, the container image to the set-eligible printers. In addition, the method includes executing the printer management application of the container image on at least one image-eligible printer of the set of image-eligible printers.

In a second aspect, the disclosure describes a server comprising one or more processors and one or more non-transitory computer-readable storage media configured to store computer-readable instructions that, when executed by the one or more processors, cause the server to perform tasks. The tasks include receiving a container image of software configured to be executed on one or more printers, where the software comprises one or more micro-services that make up a printer management application, and where the container image is associated with one or more container-eligible characteristics associated with executing the software; determining a query for printer characteristics, the printer characteristics comprising one or more characteristics related to printer functionality and one or more characteristics related to printer hardware and/or software configuration; receiving one or more responses to the query, the one or more responses comprising response information about the printer characteristics; determining one or more image-eligible micro-services that are configured to execute on a set of image-eligible printers selected based on a comparison of the response information with the container-eligible characteristics; determining that the container image is configured to execute one or more image-eligible micro-services based on the one or more image-eligible micro-services; sending the container image to the set of image-eligible printers; and executing the printer management application of the container image on at least one image-eligible printer of the set of image-eligible printers.

In a third aspect, the disclosure describes an article of manufacture comprising one or more non-transitory computer-readable storage media storing at least computer-readable instructions that, when executed by one or more processors of a server, cause the server to perform tasks. The tasks include receiving a container image of software configured to be executed on one or more printers available within the container image, where the software comprises one or more micro-services that make up a printer management application, and where the container image is associated with one or more container-eligible characteristics associated with executing the software; determining a query for printer characteristics, the printer characteristics comprising one or more characteristics related to printer functionality and one or more characteristics related to printer hardware and/or software configuration; receiving one or more responses to the query, the one or more responses comprising response information about the printer characteristics; determining one or more image-eligible micro-services that are configured to execute on a set of image-eligible printers selected based on a comparison of the response information with the container-eligible characteristics; determining that the container image is configured to execute one or more image-eligible micro-services based on the one or more image-eligible micro-services; sending the container image to the set of image-eligible printers; and initiating execution of the printer management application of the container image on at least one image-eligible printer of the set of image-eligible printers.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and design in a wide variety of different configurations, all of which are explicitly contemplated herein.

I. Overview

Example methods and apparatus are described herein related to distributing and executing container images on a cluster of printers or printing devices. Printer device management (PDM) is a crucial task for the information technology (IT) personnel at enterprise companies with large networks of printers and so printer device management can require significant resources because of complex network setup and connection of large numbers (e.g., hundreds or thousands) of printers to relatively-few computer servers. However, these resources may not be available because of other IT priorities.

Printer management applications may use a number of run time components and involve database configuration before starting. Printer management applications are applications used to install, monitor, and manage the performance and quality of printers and printer services within a network. Printer management applications may include remote maintenance applications, fleet services applications, and security services applications. Even though there is a large amount of user documentation, such as manuals, help applications and "readme" packages, for printers, IT personnel can err in installing the printer management applications onto one or more printers. Errors in installing printer management applications can lead to undesirable outcomes, such as additional error tickets, increased user time, print job errors, and wasted paper, colorant, and other resources. Furthermore, transmitting printer management applications to a number of printers in a large printer network can use a significant amount of bandwidth, which can limit the size of the transmitted printer management applications.

Some printer services are "high-runner" services that are frequently used by users and/or IT personnel, such as device settings and firmware upgrades. Therefore, software for these high-runner printer services may be upgraded regularly. Further, printers can be configured to handle computational workload to provide at least these high-runner services.

Container technologies can simplify IT operations related to printers. Using container technology, one can create a cluster of compatible printers. After the cluster is created, different micro-services associated with a service can be deployed to this cluster by downloading a container image, which includes the micro-services, from a server. A user can select the container image for downloading through a user interface (see FIG. 4). After the container image is downloaded, a task can be provided by the micro-services deployed to the cluster and the task can be readily scaled up (or down) by increasing (or decreasing) the number of container images being executed for those tasks. For example, if a task involves security software, the container image with the security software micro-service can be executed multiple times to provide multiple security software tasks for the cluster of printers.

The herein-described techniques for distributing and executing container images in a cluster of printers can determine the characteristics of a user selected container image, can create a cluster of printers that can all execute a container image, and can customize the container image based on the characteristics of the printers selected for execution out of the cluster of printers. For example, a user can select a container image to upgrade the device settings of printers in a printing network. After the container image is selected, a server can then query the printers on the printing network to determine printer status (e.g., online, busy, offline) and characteristics of the queried printers. The server can then compare the characteristics of the queried printers to the characteristics of the micro-services within the selected container image. Additionally, the server can also determine what micro-services can be excluded from the container image based on the characteristics of the printer.

Container images can be composed of firmware and/or other software. Depending on the mismatch between characteristics of the selected printers in a cluster, either part or the entire container image can be sent to the printer. For example if a firmware version on a printer matches the firmware of the container image, then the container image may not be downloaded or that specific firmware may otherwise not be provided to the printer.

Once the server determines what micro-services to include in the container image, the container image can be modified by adding or removing micro-services from the container to include only the micro-services to be sent to the cluster of selected printers. Once the container image is received at a printer, the container image can be executed by the receiving printer; e.g., to provide one or more of the micro-services. The herein-described functionality advantageously includes the ability to transmit, over the network, a limited amount of data to create and run instances of micro-services on a cluster of selected printers. Since the container image can be customized based on the printer characteristics, smaller containers with fewer micro-services to be transmitted instead of the entire container image.

Another advantage is the flexibility based on whichever feature related container image is needed can be installed on a printer, and instead of getting the complete image from a server, one can download the specific operation set is needed. This means that additional micro-services can be downloaded in a second container after a first container image is downloaded to the printer. This is an advantage since the network bandwidth may limit a size of a container image to be downloaded at one time. The container image can therefore be downloaded in parts; e.g., with crucial micro-services downloaded first and other micro-services downloaded later.

Another advantage is that once a cluster of printers associated with a selected container is created, the cluster can carry out a task using one or more micro-services provided by the selected container. Then, after the task is completed, the cluster of printers can disable or delete the micro-services and disbanding the cluster of printers. Disbanding the cluster of printers can include disabling the cluster management and resources assigned to the cluster. The ability to create and disband clusters of printers having specific micro-services would allow for a creation of cluster of printers tailored for a specific container or overall task. For example, a firmware update task can be performed on a cluster of printers that includes all printers. As another example, a contact update task can be performed on a cluster that includes a subset of the printers; e.g., a cluster of printers that stores one or more contacts being updated. The cluster of printers for each task can be disabled or deleted once the task is complete. Creating and disbanding clusters on a per-task basis allows for flexible allocation of memory and printing resources to perform tasks.

II. Example Systems

Figure 1:
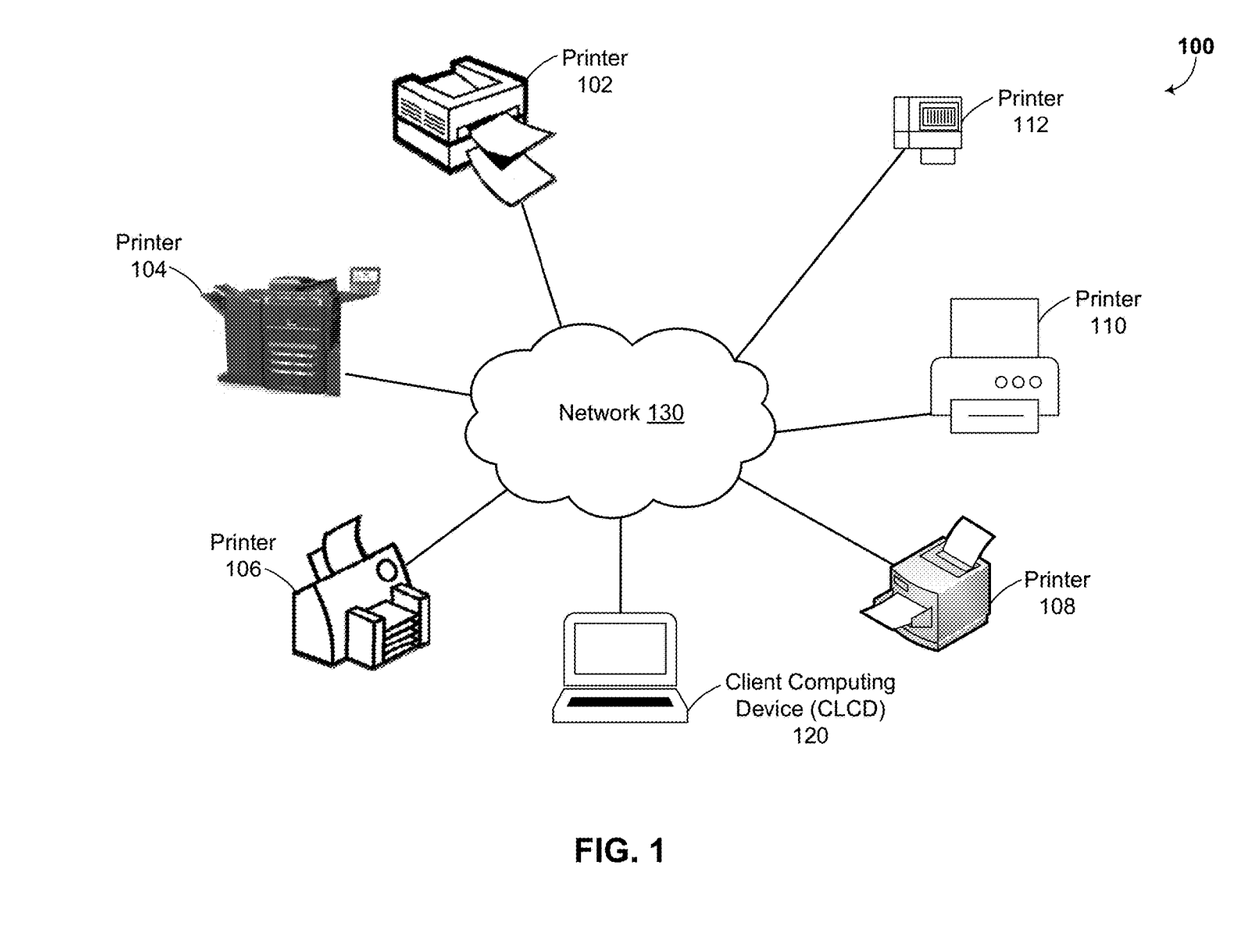
FIG. 1 is an illustration of a printing system, according to example embodiments.

FIG. 1 is an illustration of a printing system 100, according to example embodiments. The printing system 100 may include printers 102, 104, 106, 108, 110, 112, a client computing device (CLCD) 120, and a network 130.

The printers 102, 104, 106, 108, 110, and 112 are configured to reproduce digital data (e.g., by printing the digital data), scan, print, copy, e-mail, account for, communicate and/or otherwise process documents and/or files that are originally available either on paper or electronically. The printers 102, 104, 106, 108, 110, and 112 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printers 102, 104, 106, 108, 110, and 112 to use/access ED and/or ED1, and/or communicate the contents of ED and/or ED1 to/from another device.

The printers 102, 104, 106, 108, 110, and 112 can include different types of printers with different types of capabilities and both hardware and software. They can include devices that may have color or black and white printing capabilities, scanning capabilities, document box capabilities, different printer memory sizes, different printer finishing options and capabilities, a printer touch screen and/or display, different printer paper capacity, different data communication functionality, different maintenance functionality, Universal Serial Bus (USB) capabilities, and may even have different data storage functionality characteristics. The printer software includes libraries to interact with various subsystems in the printer, such as USB port, Memory, HDD, Internal Bus, Database, Storage, and Events. The printer firmware version includes panel firmware, engine firmware, system firmware, NIC firmware, scanner firmware, and fax firmware. The printer software includes libraries to interact with various subsystems in the printer, such as USB port, Memory, HDD, Internal Bus, Database, Storage, and Events. The printers 102, 104, 106, 108, 110, and 112 can also include products from various manufacturers with variations in color, speed, computing power, functionality, network connectivity, and/or other features.

The CLCD 120 is configured to connect to printers 102, 104, 106, 108, 110, and 112 though the network 130. The CLCD 120 is configured to access container image database and to send and receive data from the printers.

In operation, the CLCD 120 accesses the container image database and acquires a list of available container images for downloading. The user, through a graphical user interface like graphical user interface 400 in FIG. 4, selects the container image it wishes to download. It can then query the network to determine what printer management applications, micro-services, to include in the container image based on the characteristics of the printers and selected container image. The user interface of FIG. 4 can list the available and compatible printers. The CLCD 120, can further determine what micro-services to include or exclude from the container image selected. The user, through the CLCD 120 and user interface, can then download the container image to a selected cluster of printers that may include all or some of the compatible printers.

Figure 2:
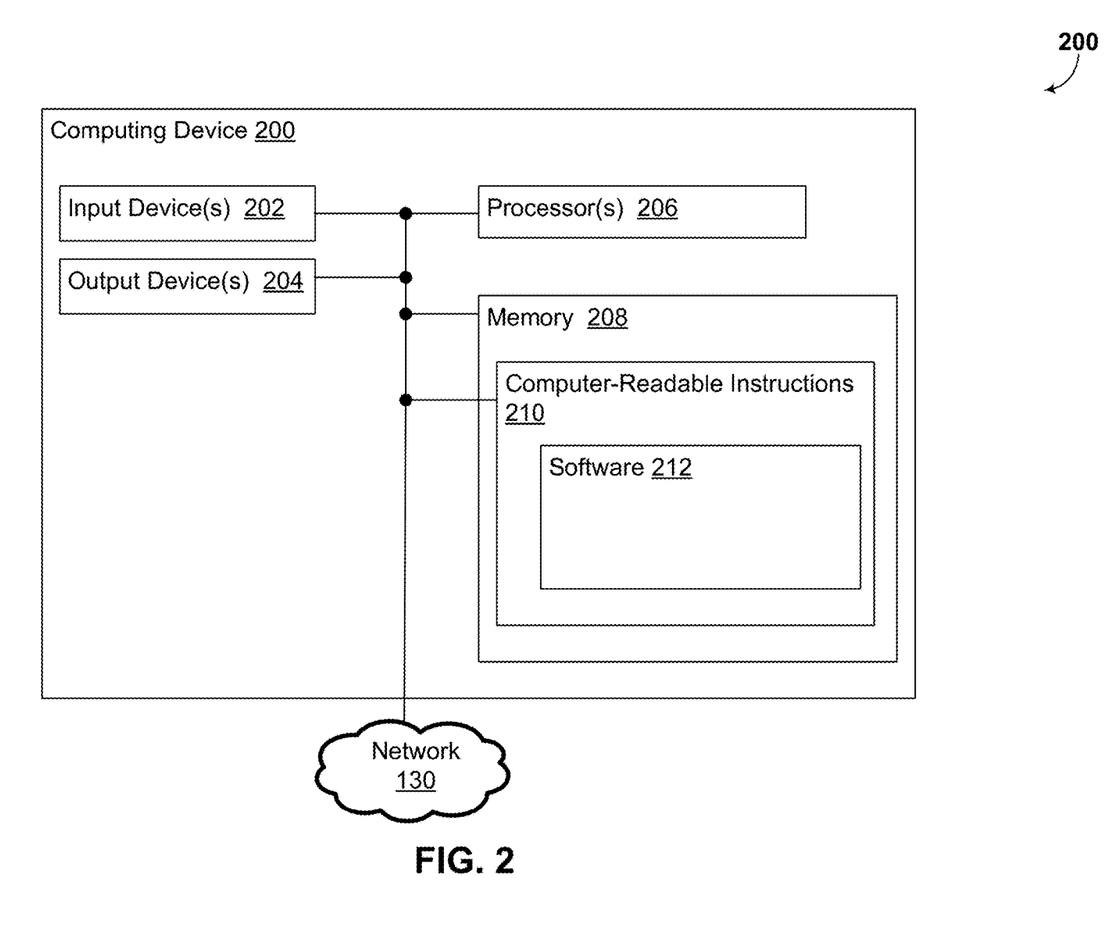
FIG. 2 is a schematic block diagram illustrating a computing device, according to an example embodiment.

FIG. 2 depicts an example embodiment of computing device 200, according to an example embodiment. In some embodiments, computing device 200 can be configured to perform one or more herein-described functions of printing system 100, printers 102, 104, 106, 108, 110, 112, CLCD 120, network 130, scenario 300, graphical user interface 400, display 410, method 500, and/or method 600.

In this example, computing device 200 can include one or more input devices 202, one or more output devices 204, one or more processors 206 and memory 208. It may also include one or more computer-readable instructions 210 and software 212. In other embodiments, computing device 200 may include other components and/or peripheral devices (e.g., detachable storage, a device accessible using a USB and so on).

Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a USB transceiver, or similar transceiver configurable to communicate via a twisted pair wire, a coaxial cable, a fiber-optic link, or a similar physical connection to a wireline network, such as wired portions of network 130, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 130.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a USB transceiver, or similar transceiver configurable to communicate via a twisted pair wire, a coaxial cable, a fiber-optic link, or a similar physical connection to a wireline network, such as wired portions of network 130, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 130. Other types of output devices can include, but are not limited to, vibration devices, haptic feedback devices, and non-visible light emission devices; e.g., devices that emit infra-red or ultra-violet light. Other output devices 204 are possible as well.

Processor(s) 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processor(s) 206 can be configured to execute computer-readable instructions 210 that are contained in memory 208 and/or other instructions as described herein.

Memory 208 can include one or more non-transitory computer-readable storage media configured to store data and/or instructions. In particular, memory 208 can store computer-readable instructions 210 that, when executed by processor(s) 206, can cause a computing device to perform functions, such as but not limited to, functions of herein-described devices, networks, methods, features, and scenarios. In particular, computer-readable instructions 210 can include instructions for herein-described software 212.

The one or more non-transitory computer-readable storage media can include one or more volatile and/or non-volatile storage components, such as optical, magnetic, organic or other memory or disc storage, which can be integrated in whole or in part with at least one of processors 206. The one or more non-transitory computer-readable storage media can include one or more components that store data for short periods of time like register memories, processor caches, and/or random access memories (RAM). The one or more non-transitory computer-readable storage media can include one or more non-transitory computer-readable storage media that store program code and/or data for longer periods of time, such as secondary or persistent long term storage; for example, read only memory (ROM), optical or magnetic disks, compact-disc read only memory (CD-ROM). In some embodiments, memory 208 can be implemented using a single physical device (e.g., one optical, magnetic, organic or other memory or disk storage unit), while in other embodiments, memory 208 can be implemented using two or more physical devices.

In particular, memory 208 can store computer-readable instructions 210 that, when executed by processor(s) 206, can cause a computing device to perform functions, such as but not limited to, functions of herein-described devices, networks, methods, features, and scenarios. In some embodiments, computer-readable instructions 210 can include instructions that, when executed, can perform part or the entire herein-described functionality of printers 102, 104, 106, 108, 110, 112, and/or CLCD 120.

III. Technique for Distributing Container Images in a Cluster of Printers

Figure 3:
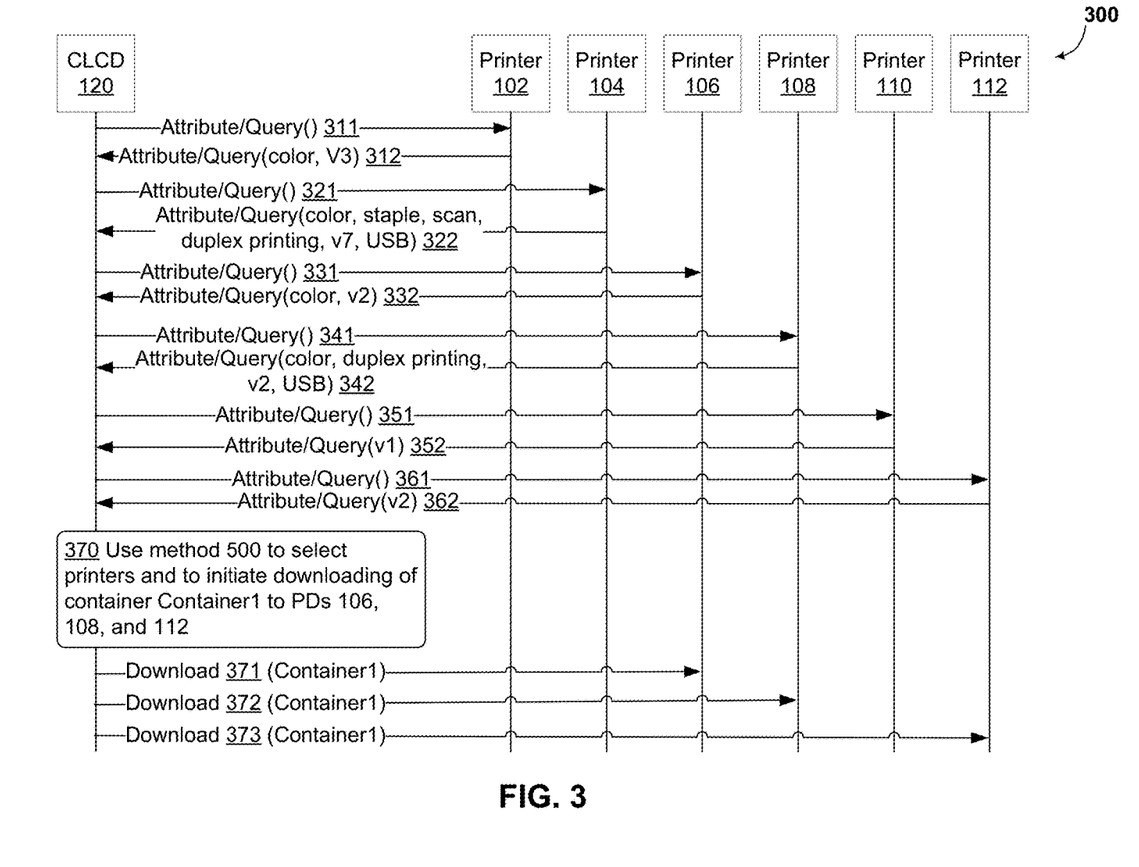
FIG. 3 is a communication flow diagram for a scenario related to querying a printing network, according to an example embodiment.

FIG. 3 is a data communications chart illustrating scenario 300, according to example embodiments. Scenario 300 involves querying a network of printers 102, 104, 106, 108, 110, and 112 for their characteristics.

In scenario 300, six printers 102, 104, 106, 108, 110, and 112 are connected to CLCD via network 130. The CLCD communicates with each printer allowing it to query for printer characteristics. The CLCD will communicate to each printer that it needs the attributes of the printer and the printer will respond with the attributes/query. If the attributes match the characteristics of the container image selected, the CLCD will determine what micro-services will be used. Once the user signals the download of the container image, with the specific micro-services, then the container image will download to the printer.

Scenario 300 begins with the CLCD 120, after the user selects a container image (see FIG. 4), sending query 311 to printer 102. Printer 102 responds to query 311 with its attributes in attribute/query 312, for example, "color" to indicate printer 102 is a color printer and "V3" to indicate a version of firmware used by printer 102. The CLCD 120 sends query 321 to query printer 104. Printer 104 responds to query 321 with its attributes in attribute/query 322, for example, with "color, staple, scan, duplex printing, v7, USB". This means that printer 104 can print in color, staple documents, scan documents, print "duplex" or on both sides of one piece of paper, has firmware version 7, and has USB capabilities.

Scenario 300 continues with the CLCD 120 sending query 331 to printer 106. Printer 106 responds to query 331 with its attributes in attribute/query 332, for example, "color, v2." This signifies that printer 106 is a color printer with firmware version 2. CLCD 120 then sends query 341 to printer 108. Printer 108 responds to query 341 with attribute/query 342 of "color, duplex printing, v2, USB" to signify that printer 108 is a color printer, can print duplex, has firmware version 2, and has USB capabilities.

Scenario 300 proceeds with CLCD 120 sending query 351 to printer 110. Printer 110 responds to query 351 with its attributes in attribute/query 352, for example, "v1." This signifies that printer 110 has firmware version 1. CLCD 120 then sends query 361 to query printer 112. Printer 112 responds to query 361 with attribute/query 362 of "v2" to indicate a firmware version of "v2."

Figure 4:
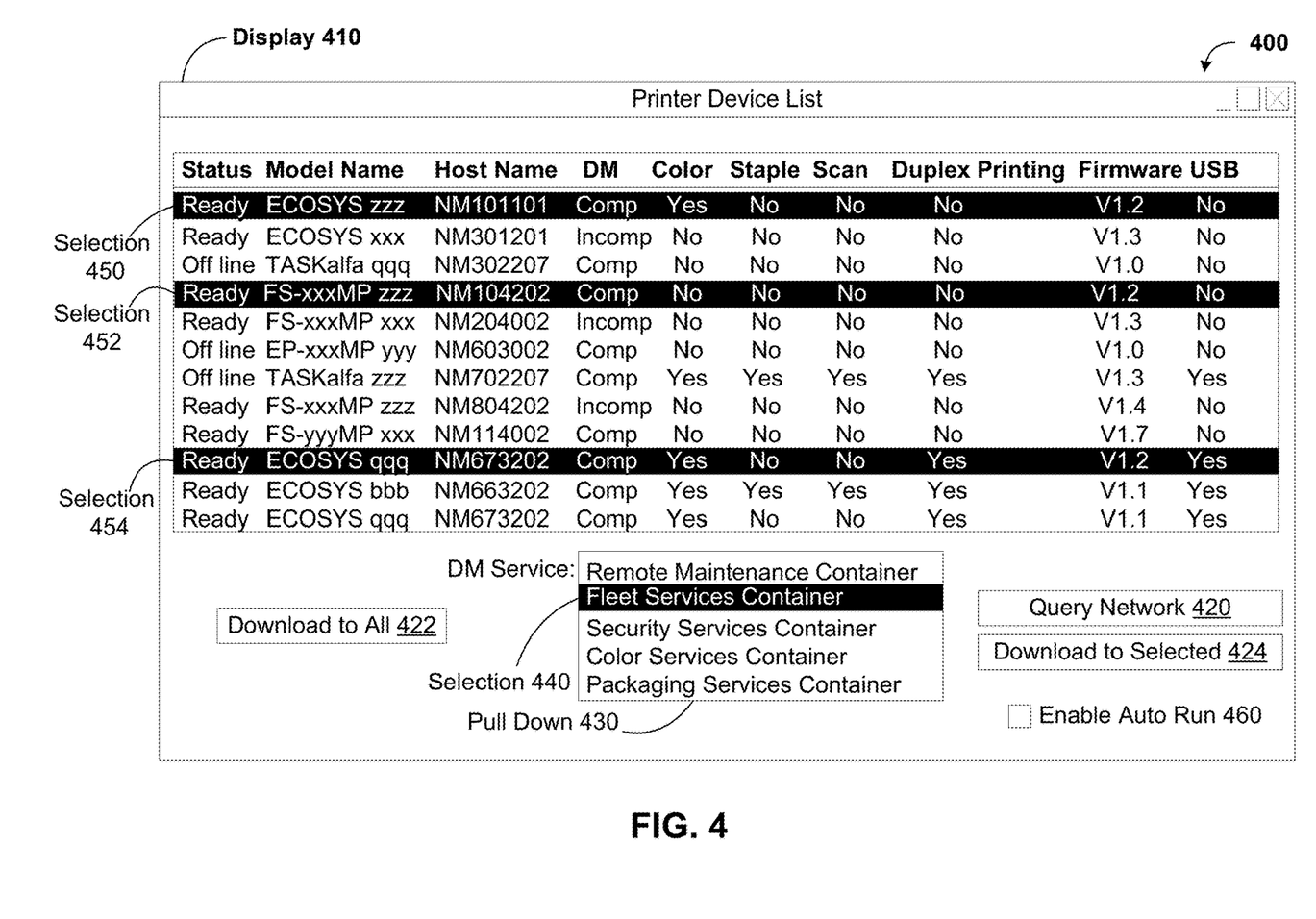
FIG. 4 is an illustration of a graphical user interface (GUI), according to example embodiments.
Figure 5:
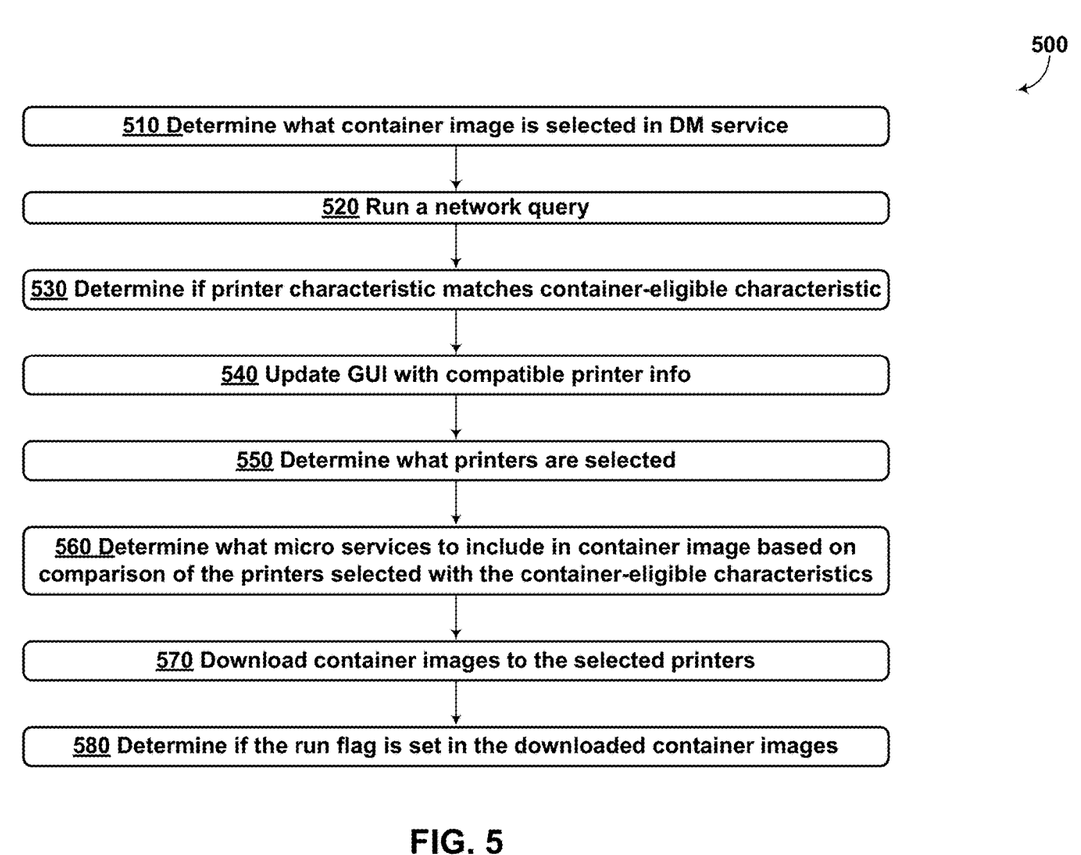
FIG. 5 is a flow chart illustrating a method, according to example embodiments.

As indicated at block 370, CLCD 120 can use method 500 to download a container "Container1" to printers selected using a graphical user interface, such as shown as display 410 of FIG. 4. After carrying out method 500, the CLCD 120 can: perform download 371 to download container Container1 to printer 106, perform download 372 to download Container1 to printer 108, and perform download 373 to download Container1 to printer 112.

FIG. 4 is a printer list provided by a graphical user interface 400. Graphical user interface 400 can have a display 410 with query network button 420, download to all button 422, download to cluster button 424, pull down 430, and enable auto run box 460. In this example, a user can use graphical user interface 400 to select a container image from the container image database, view printer status, view printer compatibility status, select containers for download, and select printers for reception and subsequent installation of selected containers. In other examples, graphical user interface 400 can be used to view and/or select more, fewer, and/or different items than those shown in FIG. 4.

In operation, the user can select a menu using pull down 430 for the download manager (DM) service for downloading a container image to one or more printers. The container image will have micro-services that make up a printer management application. For example, the user can select a container image to upgrade printer settings. The server, for example, can then determine the characteristics of the container image and what micro-services it includes. Once the container image is selected, such as a "Fleet Services Container" selected by selection 440 of pull down 430, the user can then query the network using query network button 420. To query the network, the server can query printers of the network to determine each queried printer's characteristics, such as discussed herein at least in the context of FIG. 3. The system can check if the printers are available and query each printer for their attributes and compare them to the desired attributes of the printer, such as discussed herein at least in the context of FIG. 3. The compatibility status of each printer along with additional information can be displayed on display 410. For example, printers can each respond with attributes regarding if they have color printing characteristics or what firmware version they currently have. Additionally, the printers can provide further information related to their network properties, location, and status. Then, the compatibility status of a printer can be used to determine whether a container is compatible with a printer; i.e., whether the container can properly execute on the printer.

The user can then select which printers to download the container image to. For example, the user can make selections 450, 452, and 454 to select specific printers for downloading—in the example shown in FIG. 4, selection 450 selects a printer named "NM101101", selection 452 selects a printer named "NM104202", and selection 454 selects a printer named "NM673202". After the user has selected specific printers for downloading; e.g., using selections such as selections 450, 452, and 454, the user can initiate a download to the specific printers using cluster button 424. After selection of cluster button 424, the container image would then be downloaded to the specific printers. The user can also select the download to all 422 button and the container image can download to all compatible and ready printers in the network after the CLCD 120 determines what micro-services to include in container image based on comparison of the printers selected with the container-eligible characteristics; e.g., as discussed herein at least in the context of method 500 and FIG. 5.

Additionally, the user can use enable auto run box 460 to allow the container image to automatically run once the image is downloaded into the printer. If the enable auto run box 460 is selected then a run flag is set. If the enable auto run box 460 is not selected then the run flag is not set. The run flag can be set as a parameter of a command used to download the container and/or based on a setting of an auto run bit in the container. The run flag can be used to determine whether or not to execute the container as soon as possible after being downloaded to the printer. That is, if the run flag is set, the container can be executed as soon as possible after download, otherwise, the run flag is not set and the container will not be executed until some entity (e.g., the printer or a user) executes the container.

IV. Example Methods of Operation

FIG. 5 is a flow chart illustrating a method 500, according to example embodiments. Method 500 can be carried out by a computing device such as CLCD 120 and/or a printer; e.g., printer 102, 104, 106, 108, 110, 112. The computing device can use a GUI, such as graphical user interface 400 discussed in FIG. 4, to carry out at least part of method 500.

Method 500 can begin at block 510, where the computing device determines which container image is selected using pull down 430 of graphical user interface 400 of FIG. 4; e.g., a "Fleet Services Container" selected as selection 440 of pull down 430. The container can have specific characteristics related to what micro-services and run time components they contain. For example, a remote maintenance container can include micro-services related to device restarts, device settings, firmware updates and/or upgrades, and run time components related to build libraries, NET core runtime software, and Firebird database management system software. In another example, a security services container can include certificate, password policy, and protocol micro-services and their required run time components.

At block 520, the computing device runs a network query. The query can include a query for printer characteristics, where the printer characteristics can be one or more characteristics related to printer functionality and/or one or more characteristics related to printer hardware and/or software configuration. For example, the printer characteristics can include characteristics related to color or black and white printing capabilities, scanning capabilities, document box capabilities, different printer memory sizes, different printer finishing options and capabilities, a printer touch screen and/or display, different printer paper capacity, different data communication functionality, different maintenance functionality, and may even have different data storage functionality characteristics. The printer characteristics can further include characteristics related to types and versions for the printer's operating system, printer software, printer firmware, and/or system services. Additionally, the printer characteristics can further include characteristics about printer hardware; e.g., characteristics about a printer's processor, motherboard, input and output devices, display, tray mechanics, printing mechanics, scanning mechanics, and/or other hardware.

At block 530, the computing device can determine if the printer characteristics match the container image characteristics. For example, the computing device can receive one or more responses to the network query of block 520, where the one or more responses can include information about the printer characteristics. Then, the computing device can compare the printer characteristics to the container-eligible characteristics discussed at block 620. For example, suppose a container image relates to a color printer. Then, the query run at block 520 can return color-printer-related characteristics, so that the computing device can determine which printers on the network are color printers based on the color-printer-related characteristics so that the container image can run on the color printers. Color-printer-related characteristics can include characteristics about whether the printer can print in color, a type of color printer technology used (e.g., ink-jet, solid ink, laser) and/or the type of color model used (for example, red green blue (RGB), cyan magenta yellow black (CMYK). In another example, if a firmware update is being done, a firmware update container image is chosen and printers that match firmware characteristics related to the firmware update container image can execute the firmware update. Firmware characteristics can include characteristics about the current firmware version, when the firmware was last updated, and/or whether the firmware is backwards and/or forward compatible. The firmware update container image can also be cooperatively executed within the cluster of printers and after cooperatively executing the firmware update, the firmware upgrade can be deleted.

In some examples, containers can be transiently stored; e.g., a container can be downloaded, stored in persistent and/or non-persistent storage between a time of downloading and a time of being executed, and then the container can be deleted from persistent and/or non-persistent storage after being executed. That is, the container is "transient" since it only is stored long enough to be downloaded and executed.

In some examples, containers can be "non-transient" and be non-transiently stored; that is, a non-transient container can remain stored on a device for a longer time that a time to be downloaded and executed. For example, a container CON1 with a firmware upgrade can have a reversible upgrade. Then, container CON1 can be downloaded to a device (such as a printer), and executed to install new firmware that is part of the reversible upgrade. However, container CON1 would not be deleted immediately after installing the new firmware to allow for reversing the firmware upgrade. Rather, container CON1 would remain stored on the device until being deleted (e.g., when a new firmware upgrade was being installed) or until the reversible firmware upgrade is reversed. If the reversible firmware upgrade is reversed, container CON1 can remove the installed new firmware, reinstall the old software, and delete container CON1.

In related examples, a container CON2 can have multiple versions of firmware and/or other software. Then, container CON2 can be downloaded to a printer or other device, install and/or uninstall the versions of firmware and/or other software on the printer as necessary and/or upon request, and container CON2 would persist until being deleted to enable installation and/or uninstallation of the versions of firmware and/or other software. In these examples, containers CON1 and CON2 would be non-transient containers. Other examples of transient and non-transient containers are possible as well.

Comparing printer characteristics with container-eligible characteristics before sending containers can reduce the amount of bandwidth and other resources needed to send container images and store containers on printers, as only the printers that can run the container image based on comparison of printer characteristics with container-eligible characteristics receive and subsequently store the container image and printers that cannot run the container image based on the comparison of printer characteristics with container-eligible characteristics do not receive the container image.

At block 540, the computing device updates the GUI with compatible printer info. For example, this would include the GUI displaying what printers are compatible with the container image selected, what printers are available, the network information related to each printer including IP addresses, where the printers are located, what the printer characteristics include, and/or the model name of each printer. This would allow the user to download the container image to specific printers based on the displayed information.

At block 550, the computing device determines one or more selected printers using the GUI. This involves determining what printers a user has selected for receiving the container image selected. For example, the user may want to execute the container image on a small cluster of printers within the same area, for example an office floor or room. Then, the user can select the printers within the same area using the GUI. Then, the computing device can use the selection information provided by the GUI to create such a cluster of the printers within the same area. As another example, a user may use the GUI to exclude certain printers based on their IP address or other printer properties as part of selecting printers that are compatible with a selected container image. Other examples of selecting printers and/or containers using the GUI are possible as well.

At block 560, the computing device determines what micro-services to include in container image based on comparison between the printers selected using the GUI and the container-eligible characteristics. Determining micro-services that are included in a container for printers selected with the container-eligible characteristics allows for customization of the container image, which may reduce the amount of bandwidth needed to transmit and/or time needed to install the container image.

Determining micro-services can involve determining what micro-services are and/or are not needed in the container image based on the printer's characteristics and the selected container image characteristics. For example, if the container image selected includes a firmware micro-service and the printers selected do not require a firmware update, then the firmware micro-service would be removed from the container image before sending it to the selected printers. As another example, the container image selected may be a USB firmware update that contains additional firmware updates for the printer itself. If a printer selected has up to date printer firmware, then additional firmware updates for the printer can be removed from the container image and the remaining micro-service can be sent to the selected printers. For example, when the USB firmware update container image is selected and a printer firmware update is also in the container but is not needed, because the printers have an up to date printer firmware version, then the printer firmware update is removed from the container.

At block 570, the computing device downloads the container images to the selected printers. Downloading a container image can include sending the container image, with specific micro-services, to the user selected printers.

At block 580, the selected printers determine if the auto run bit is set in the downloaded containers; e.g., as set via graphical user interface 400 using enable auto run 460 box. If the auto run bit or is set, then the container image is ready to execute once container image is downloaded onto the printer and so can be immediately executed after downloading. Otherwise, the container image will wait until another input initiates execution of the container image; e.g., a user command, an internal input to run a micro-service of the container. In some examples, the auto run bit can be used as a run flag for determining immediate execution of a downloaded container as discussed above in the context of enable auto run 460 box.

Additionally, the printers may be queried before the container image is executed to determine if they are idle. If the printer is not idle, then execution of the container image can be delayed until the printer becomes idle, as some IT personnel may prefer that execution of container images not interfere with tasks currently operating on printers. For example, the container image may be ready to be downloaded to a printer but the printer may be currently printing a document for a client. In this example, the printer is not idle and the print job should not be interrupted and therefore the downloading of the container is delayed until the printer finishes the print job and becomes idle.

In addition, executing the container image may involve executing multiple instances of at least one of the micro-services based on user and/or printer demands. Furthermore, the execution of the container image can include the container image being executed across multiple printers in a cluster. The cluster can be managed to execute the container image and multiple instances of the micro-services within the container image. The printers may communicate with each other and share resources to execute the micro-services. In addition, for example, additional compatible micro-services may be downloaded to the printer. For example, if the remote maintenance container has to add a standard "Printer Help" contact to contact IT to maintain and/or repair printers, the container can download a contact book micro-service to add the "Printer Help" contact. Once the micro-services are done executing, some or all of the instances of the micro-services and/or container image can be disabled or deleted. Disabling the container image would stop the execution of the container image until later enabled and it can, for example, release some memory and other resources needed for execution. Deleting the container image would stop the execution of the container image and it can, for example, release all memory and other resources the container image needs for execution as well as release the memory holding the container image file.

Executing multiple containers may require resource management based on limited amount of, for example, memory available on the printers. Containers downloaded to the printers can be managed based on threshold level of resource usage, where the least-recently-used micro-service can be deleted or disabled in order to make more memory available. This can involve determining that the container images are running low on resources and determining the least-recently-used micro-service and/or a least used micro-service. For example, a log of when the micro-services are used and how many times a micro-service has been used can be processed to determine which N1 (N1>0) micro-services are least recently used and so are the N1 least-recently-used micro-services and/or which N2 (N2>0) micro-services are least often used so are the N2 least-used micro-services.

Executing containers across a cluster of multiple printers may require sharing information between the printers within the cluster. Sharing information can involve communicating data between micro-services executing on different printers. Therefore, the information that passes between the printers can be managed and verified so that information from one printer to another specific printer can be sent at specific times. Furthermore, because multiple instances of a micro-service can occur, management of the micro-service instances can include tracking a number of printers executing micro-service instances, how many micro-service instances are executing within a cluster of printers, and/or related cluster/container usage statistics. Once all the micro-service instances are finished executing within a cluster of printers, the cluster can be released by deleting the containers within the cluster. As another example, a server can receive a request to execute a particular image-eligible micro-service. Then, the server can select a cluster of printers to execute the micro-service. The server can manage execution of the micro-service on the cluster of printers by communicating data between the printers of the cluster. For example, if the micro-service relates to a firmware update, the server can create a cluster of printers that are to perform a firmware update, ensure each printer receives the update firmware, track progress of firmware installation, and verify that the firmware update is complete. Once the firmware update is complete, the server can delete or disable the firmware update micro-service, and if the micro-service is deleted, the server can release the cluster of printers. Releasing the cluster of printers will release the memory and other resources used to manage the cluster of printers.

Figure 6:
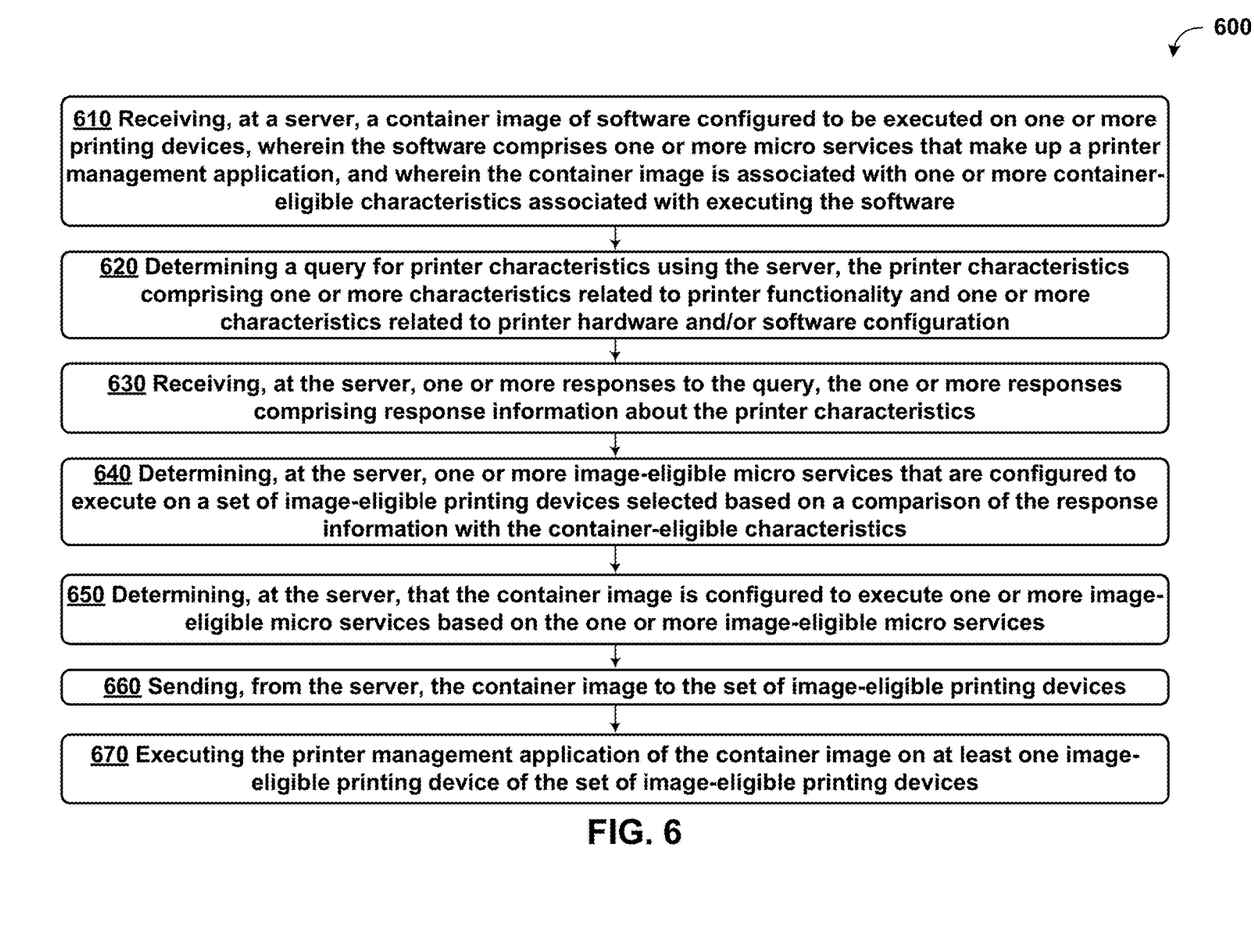
FIG. 6 is a flow chart illustrating a method, according to example embodiments.

FIG. 6 is a flow chart illustrating a method 600, according to example embodiments. Method 600 can be carried out by a computing device such as CLCD 120 and/or a printer; e.g., printers 102, 104, 106, 108, 110, 112.

Method 600 can begin at block 610, the method 600 may include receiving, at a server, a container image of software configured to be executed on one or more printers available within the container image, wherein the software comprises one or more micro-services that make up a printer management application, and wherein the container image is associated with one or more container-eligible characteristics associated with executing the software, as discussed above herein in the context of at least FIG. 4.

In some examples, receiving the one or more responses to the query can include sending the query for printer characteristics to a database storing information about the printer characteristics, and after sending the query for printer characteristics from the server to the database, receiving the one or more responses to the query from the database, as discussed above herein in the context of at least FIG. 3.

At block 620, the method 600 may include determining a query for printer characteristics using the server, the printer characteristics comprising one or more characteristics related to printer functionality and one or more characteristics related to printer hardware and/or software configuration, as discussed above herein in the context of at least FIG. 3. In some examples, the one or more characteristics related to printer hardware and/or software configuration comprises one or more characteristics related to a printer firmware version, a printer software, and/or a printer operating system. In some other examples, the one or more characteristics related to printer hardware and/or software configuration can include one or more characteristics related to a printer color printing capability, a scanning capability, a document box capability, a printer memory size, a printer finishing device, a printer touch screen and/or display, and/or a printer paper capacity. In some other examples, the one or more characteristics related to printer functionality can include one or more characteristics related to a printing functionality, a scanning functionality, a display functionality, a data communication functionality, a maintenance functionality, and/or a data storage functionality characteristic, as discussed above herein in the context of at least FIG. 1.

At block 630, the method 600 may include receiving, at the server, one or more responses to the query, the one or more responses comprising response information about the printer characteristics, as discussed above herein in the context of at least FIG. 3.

At block 640, the method 600 may include determining, at the server, one or more image-eligible micro-services that are configured to execute on a set of image-eligible printers selected based on a comparison of the response information with the container-eligible characteristics, as discussed above herein in the context of at least FIG. 3. In some examples, the particular image-eligible micro-service can include a firmware upgrade micro-service and the method 600 can further include: cooperatively executing a firmware upgrade on the cluster of image-eligible printers using the firmware upgrade micro-service, determining whether each image-eligible printers of the cluster of image-eligible printers has executed the firmware upgrade micro-service, and after determining that each image-eligible printers of the cluster of image-eligible printers has executed the firmware upgrade micro-service, deleting the firmware upgrade micro-service from the cluster of image-eligible printers, as discussed above herein in the context of at least FIG. 5.

At block 650, the method 600 may include determining, at the server, that the container image is configured to execute one or more image-eligible micro-services based on the one or more image-eligible micro-services, as discussed above herein in the context of at least FIG. 5. This may include determining what micro-services within the selected container image should be sent to the selected printers based on the characteristics of the selected printers.

At block 660, the method 600 may include sending, from the server, the container image to the set of image-eligible printers. This may include sending the customized container image with the selected micro-services to the selected image-eligible printers, as discussed above herein in the context of at least FIG. 3. In some examples, the method 600 can further include after sending the container image to the set of image-eligible printers, cooperatively performing a task on two or more of the image-eligible printers by executing a micro-service provided by the container image on each of the two or more of the image-eligible printers, as discussed above herein in the context of at least FIG. 5. In some other examples, sending the container image to the set of image-eligible printers can include: sending the container image to the set of image-eligible printers, where the container image comprises a container image run flag, after sending the container image, determining whether the container image run flag is set at a particular image-eligible printers of the set of image-eligible printers, and after determining that the container image run flag is set, executing the container image on the particular image-eligible printer, as discussed above herein in the context of at least FIG. 4.

In some other examples, the method 600 can include after sending the container image to a first image-eligible printer of the set of image-eligible printers, downloading a standalone micro-service to the first image-eligible printer, wherein the standalone micro-service is compatible with the container image, integrating the standalone micro-service with the container image, and communicating to the set of image-eligible printers that the standalone micro-service is available, as discussed above herein in the context of at least FIG. 5. In some examples, the method 600 can include after sending the container image to a first image-eligible printer of the set of image-eligible printers determining whether the first image-eligible printer hosting the container image exceeds a threshold level of resource usage, after determining that the first image-eligible printer hosting the container image exceeds the threshold level of resource usage, determining a least-recently-used micro-service within the container image based on a usage time for each micro-service by the first image-eligible printer, and deleting the least-recently-used micro-service from the printer management application, as discussed above herein in the context of at least FIG. 5.

In some other examples, the method 600 may include after sending the container image to a first image-eligible printer of the set of image-eligible printers, determining whether the first image-eligible printer hosting the container image is running low on resources; and after determining that the first image-eligible printer hosting the container image is running low on resources: determining a least-used micro-service of the one or more image-eligible micro-services that has been least used, and disabling the least-used micro-service of the printer management application, wherein disabling the least-used micro-service releases run time memory and other operating system resources used by the least-used micro-service, as discussed above herein in the context of at least FIG. 5.

At block 670, the method 600 may include executing the printer management application of the container image on at least image-eligible printer of the set of image-eligible printers, as discussed above herein in the context of at least FIG. 5. This includes executing the micro-services within the container image once the printer is ready to execute these applications. In some examples, the method 600 can include running multiple instances of a micro-service within the container image on one or more image-eligible printers of the set of image-eligible printers s, as discussed above herein in the context of at least FIG. 5. In other examples, the method 600 can include disabling multiple instances of a micro-service within the container image on one or more image-eligible printers of the set of image-eligible printers, as discussed above herein in the context of at least FIG. 5.

In some other examples, the method 600 can include receiving, at the server, a request to execute a particular image-eligible micro-service of the one or more image-eligible micro-services, selecting, by the server, a cluster of image-eligible printers to execute the particular image-eligible micro-service, the cluster selected from the set of image-eligible printers, managing, by the server, communication related to the particular image-eligible micro-service on the cluster of image-eligible printers, determining, by the server, execution of one or more instances of the particular image-eligible micro-service on the cluster of image-eligible printers by determining a number of instances of the one or more micro-services are executed on the cluster of image-eligible printers which image-eligible printers of the cluster execute the one or more instances of the particular image-eligible micro-service, and releasing, by the server, the cluster of more than one image-eligible printers, as discussed above herein in the context of at least FIG. 5.

V. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

What is claimed is:

1. A method, comprising:
receiving, at a server, a container image of software configured to be executed on one or more printers, wherein the software comprises one or more micro-services that make up a printer management application, and wherein the container image is associated with one or more container-eligible characteristics associated with executing the software;
determining a query for printer characteristics using the server, the printer characteristics comprising one or more characteristics related to printer functionality and one or more characteristics related to printer hardware and/or software configuration;
receiving, at the server, one or more responses to the query, the one or more responses comprising response information about the printer characteristics;
determining, at the server, one or more image-eligible micro-services that are configured to execute on a set of image-eligible printers selected based on a comparison of the response information with the container-eligible characteristics;
determining, at the server, that the container image is configured to execute one or more image-eligible micro-services based on the one or more image-eligible micro-services;
sending, from the server, the container image to the set of image-eligible printers; and
executing the printer management application of the container image on at least one image-eligible printer of the set of image-eligible printers.

2. The method of claim 1, wherein executing the printer management application comprises:
determining whether a first image-eligible printer of the set of image-eligible printers is not idle; and
after determining that the first image-eligible printer is not idle, delaying execution of the printer management application by the first image-eligible printer until the first image-eligible printer becomes idle.

3. The method of claim 1, wherein the one or more characteristics related to printer hardware and/or software configuration comprises one or more characteristics related to a printer firmware version, a printer software, and/or a printer operating system.

4. The method of claim 1, wherein the one or more characteristics related to printer hardware and/or software configuration comprises one or more characteristics related to: a printer color printing capability, a scanning capability, a document box capability, a printer memory size, a printer finishing device, a printer touch screen and/or display, and/or a printer paper capacity.

5. The method of claim 1, wherein the one or more characteristics related to printer functionality comprises one or more characteristics related to: a printing functionality, a scanning functionality, a display functionality, a data communication functionality, a maintenance functionality, and/or a data storage functionality characteristic.

6. The method of claim 1, further comprising:
after sending the container image to the set of image-eligible printers, cooperatively performing a task on two or more of the set of image-eligible printers by executing a micro-service provided by the container image on each of the two or more of the set of image-eligible printers.

7. The method of claim 1, further comprising:
running multiple instances of a micro-service within the container image on one or more image-eligible printers of the set of image-eligible printers.

8. The method of claim 1, further comprising:
disabling multiple instances of a micro-service within the container image on one or more image-eligible printers of the set of image-eligible printers.

9. The method of claim 1, wherein receiving the one or more responses to the query comprises:
sending the query for printer characteristics to a database storing information about the printer characteristics, and
after sending the query for printer characteristics from the server to the database, receiving the one or more responses to the query from the database.

10. The method of claim 1, wherein sending the container image to the set of image-eligible printers comprises:
sending the container image to the set of image-eligible printers, wherein the container image comprises a container image run flag;
after sending the container image, determining whether the container image run flag is set at a particular image-eligible printer of the set of image-eligible printers; and
after determining that the container image run flag is set, executing the container image on the particular image-eligible printer.

11. The method of claim 1, further comprising:
receiving, at the server, a request to execute a particular image-eligible micro-service of the one or more image-eligible micro-services;
selecting, by the server, a cluster of image-eligible printers to execute the particular image-eligible micro-service, the cluster selected from the set of image-eligible printers;
managing, by the server, communication related to the particular image-eligible micro-service on the cluster of image-eligible printers;
determining, by the server, execution of one or more instances of the particular image-eligible micro-service on the cluster of image-eligible printers by determining a number of instances of the one or more micro-services are executed on the cluster of image-eligible printers which image-eligible printers of the cluster execute the one or more instances of the particular image-eligible micro-service; and
releasing, by the server, the cluster of image-eligible printers.

12. The method of claim 11, wherein the particular image-eligible micro-service comprises a firmware upgrade micro-service, and wherein the method further comprises:
cooperatively executing a firmware upgrade on the cluster of image-eligible printers using the firmware upgrade micro-service;
determining whether each image-eligible printer of the cluster of image-eligible printers has executed the firmware upgrade micro-service; and
after determining that each image-eligible printer of the cluster of image-eligible printers has executed the firmware upgrade micro-service, deleting the firmware upgrade micro-service from the cluster of image-eligible printers.

13. The method of claim 1, wherein the method further comprises:
after sending the container image to a first image-eligible printer of the set of image-eligible printers, downloading a standalone micro-service to the first image-eligible printer, wherein the standalone micro-service is compatible with the container image, integrating the standalone micro-service with the container image; and communicating to the set of image-eligible printers that the standalone micro-service is available.

14. The method of claim 1, wherein the method further comprises:

after sending the container image to a first image-eligible printer of the set of image-eligible printers, determining whether the first image-eligible printer hosting the container image exceeds a threshold level of resource usage;

after determining that the first image-eligible printer hosting the container image exceeds the threshold level of resource usage, determining a least-recently-used micro-service within the container image based on a usage time for each micro-service by the first image-eligible printer; and deleting the least-recently-used micro-service from the printer management application.

15. The method of claim 1, wherein the method further comprises:

after sending the container image to a first image-eligible printer of the set of image-eligible printers, determining whether the first image-eligible printer hosting the container image is running low on resources; and after determining that the first image-eligible printer hosting the container image is running low on resources:

determining a least-used micro-service of the one or more image-eligible micro-services that has been least used, and disabling the least-used micro-service of the printer management application, wherein disabling the least-used micro-service releases run time memory and other operating system resources used by the least-used micro-service.

16. A server, comprising:

one or more processors; and one or more non-transitory computer-readable storage media configured to store computer-readable instructions that, when executed by the one or more processors, cause the server to perform tasks comprising:

receiving a container image of software configured to be executed on one or more printers, wherein the software comprises one or more micro-services that make up a printer management application, and wherein the container image is associated with one or more container-eligible characteristics associated with executing the software;

determining a query for printer characteristics, the printer characteristics comprising one or more characteristics related to printer functionality and one or more characteristics related to printer hardware and/or software configuration;

receiving one or more responses to the query, the one or more responses comprising response information about the printer characteristics;

determining one or more image-eligible micro-services that are configured to execute on a set of image-eligible printers selected based on a comparison of the response information with the container-eligible characteristics;

determining that the container image is configured to execute one or more image-eligible micro-services based on the one or more image-eligible micro-services;

sending the container image to the set of image-eligible printers; and executing the printer management application of the container image on at least one image-eligible printer of the set of image-eligible printers.

17. The server of claim 16, wherein the one or more characteristics related to printer hardware and/or software configuration comprises one or more characteristics related to a printer firmware version, a printer software version, and/or a printer operating system.

18. The server of claim 16, wherein receiving the one or more responses to the query comprises:

sending the query for printer characteristics from the server to the set of image-eligible printers, and after sending the query for printer characteristics from the server to the set of image-eligible printers, receiving the one or more responses to the query from the set of image-eligible printers.

19. The server of claim 16, wherein sending the container image to the set of image-eligible printers comprises:

determining whether a container image run flag is set;

after determining that the container image run flag is set, enabling the container image for immediate execution after sending; and sending the enabled container image to the set of image-eligible printers.

20. An article of manufacture comprising one or more non-transitory computer-readable storage media storing at least computer-readable instructions that, when executed by one or more processors of a server, cause the server to perform tasks comprising:

receiving a container image of software configured to be executed on one or more printers, wherein the software comprises one or more micro-services that make up a printer management application, and wherein the container image is associated with one or more container-eligible characteristics associated with executing the software;

determining a query for printer characteristics, the printer characteristics comprising one or more characteristics related to printer functionality and one or more characteristics related to printer hardware and/or software configuration;

receiving one or more responses to the query, the one or more responses comprising response information about the printer characteristics;

determining one or more image-eligible micro-services that are configured to execute on a set of image-eligible printers selected based on a comparison of the response information with the container-eligible characteristics;

determining that the container image is configured to execute one or more image-eligible micro-services based on the one or more image-eligible micro-services;

sending the container image to the set of image-eligible printers; and initiating execution of the printer management application of the container image on at least one image-eligible printer of the set of image-eligible printers.

* * * * *